Aug. 13, 1940.   G. E. RYERSON   2,211,292
SPLIT CYCLE INTERNAL COMBUSTION ENGINE
Filed Nov. 7, 1938   3 Sheets-Sheet 1

Inventor
Gerald E. Ryerson
By
Attorneys

Aug. 13, 1940.  G. E. RYERSON  2,211,292
SPLIT CYCLE INTERNAL COMBUSTION ENGINE
Filed Nov. 7, 1938   3 Sheets-Sheet 2

Inventor
Gerald E. Ryerson

By
Attorneys

Aug. 13, 1940.                G. E. RYERSON                2,211,292
SPLIT CYCLE INTERNAL COMBUSTION ENGINE
Filed Nov. 7, 1938                3 Sheets-Sheet 3

Inventor
Gerald E. Ryerson
By
Attorneys

Patented Aug. 13, 1940

2,211,292

UNITED STATES PATENT OFFICE 2,211,292

SPLIT CYCLE INTERNAL COMBUSTION ENGINE

Gerald E. Ryerson, Washington, D. C.

Application November 7, 1938, Serial No. 239,341
4 Claims. (Cl. 123—11)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government of the United States of America for governmental purposes without the payment to me of any royalty thereon.

This invention relates to rotary internal combustion engines.

One of the objects of this invention is the provision of an engine of the type mentioned in which power is developed between the blades of co-acting vanes.

Another object of this invention is the provision of a rotary internal combustion engine having only a few moving parts, thus obviating a great deal of friction losses.

Still another object of this invention is the provision of an internal combustion engine in which the compression ratio and length of effective stroke can be varied while the engine is in operation so that maximum efficiency at any speed and load can be obtained. Such changes also permit the use of a wide variety of fuels without effecting the efficiency of the engine.

A still further object of this invention is the provision of an engine of the type mentioned which does not employ poppet valves, cams, and so forth.

While this invention will be hereinafter described with particular reference to the Otto principle or cycle of operation, it is to be understood that it is equally as well adaptable to the Diesel, Hesselman, or other principles. Furthermore, an adjustable feature of this invention permits any embodiment thereof to be selectively changed to perform on various types of operating cycles as well as converted into a compressor, if desired.

The following description considered together with the accompanying drawings will disclose this invention more fully, its construction, arrangement and operation of parts, and further objects and advantages thereof will be apparent.

Referring with more particularity to the drawings, in which like numerals designate like parts, this invention consists essentially of two units, namely, the power unit housed in a casing 20 and the converter unit housed in a casing 21.

Figures 1, 4:
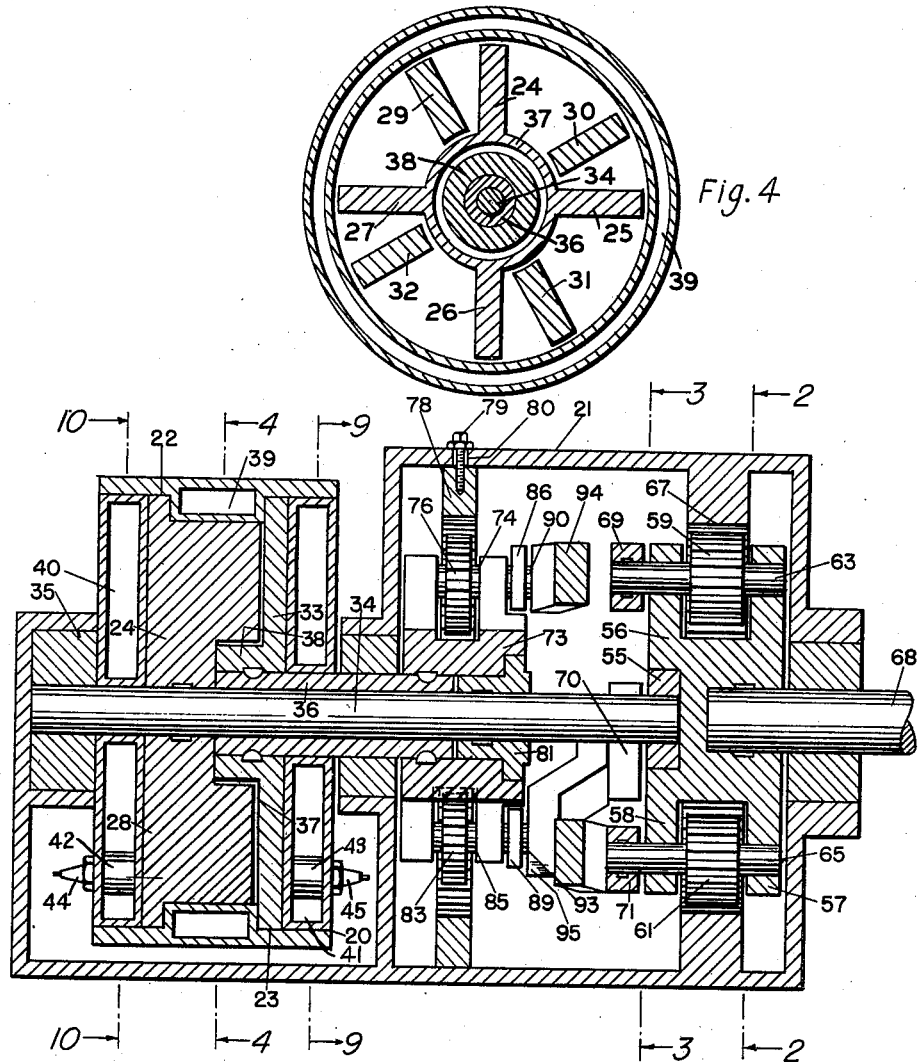
Figure 1 is a longitudinal section in elevation through the axis of an embodiment of this invention.
Figure 4 is a section along the line 4—4 of Figure 1.

The power unit is composed of two vane assemblies 22 and 23. The vane assembly 22 has an even number of vanes, say four, designated by the numerals 24, 25, 26 and 27 mounted on a disc 28; and the vane assembly 23 has a like number of vanes 29, 30, 31 and 32 mounted on a disc 33. The vane assembly 22 is radially fixed to a shaft 34, one end of said shaft being rotatably mounted in bearing 35 on the outer end of the casing of the power unit. The vane assembly 23 is radially fixed to sleeve 36 and coaxially mounted with the vane assembly 22, said sleeve being rotatably mounted on the shaft 34, substantially as shown. The vanes of the vane assembly 22 project radially from a concentric cylindrical member 37, which cylindrical member is adapted to receive a smaller concentric cylindrical member 38 on the vane assembly 23, there being just enough space radially between the vanes 29, 30, 31, 32 and the cylinder 38 for the thickness of the cylinder 37. The outer ends of the vanes of both vane assemblies are in a circle having a diameter substantially equal to the inside diameter of the inner wall of the annular water jacket 39, said water jacket being disposed between the discs of the two vane assemblies, substantially as shown. The vanes of each vane assembly are disposed between the vanes of the other, substantially as shown in Figure 4, thus providing eight variable chambers within which the power of the engine is developed. Any sealing means known in the art may be used between these chambers, although none is shown in the drawings.

Figure 6:
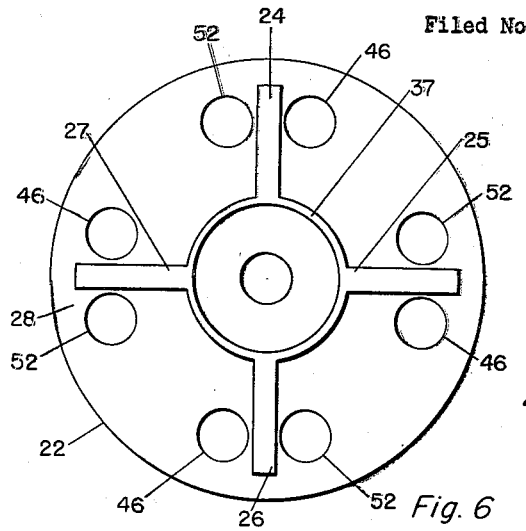
Figure 6 is an end view of the vane assembly 22.
Figure 7:
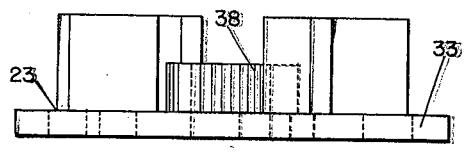
Figure 7 is a plan view of Figure 5.
Figure 8:
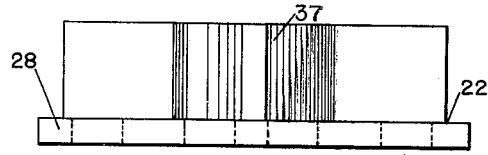
Figure 8 is a plan view of Figure 6.
Figure 9:
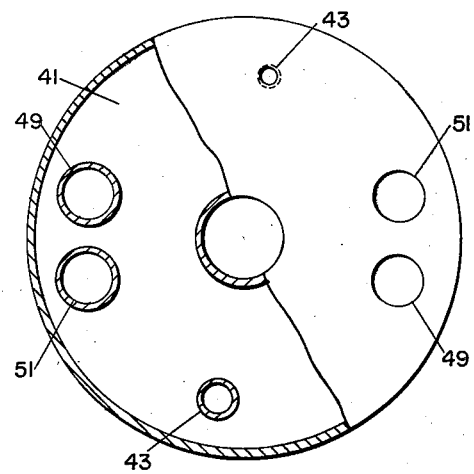
Figure 9 is an end view of the water jacket 41 with a partial section along the line 9—9 of Figure 1.
Figure 10:
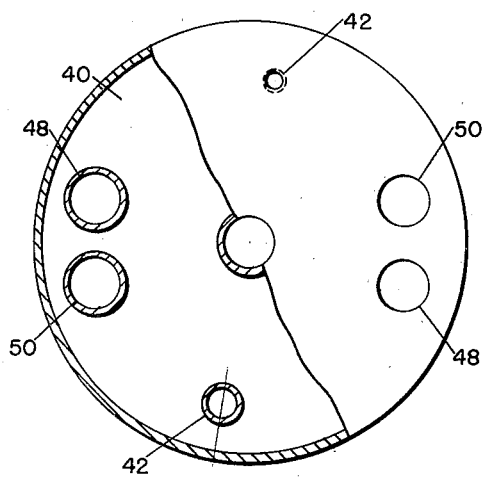
Figure 10 is an end view of the water jacket 40 with a partial section along the line 10—10 of Figure 1.

The water jacket 40 is disposed flush with the outer side of the disc 28 of the vane assembly 22 and the water jacket 41 is disposed on the outer side of the disc 33 of the vane assembly 23, substantially as shown. The water jackets 40 and 41 are provided with tubular housings 42 and 43, respectively, extending through the width of the jackets into which spark plugs 44 and 45, respectively, are disposed with the spark gap of each plug substantially flush with the inner wall of its respective water jacket. The disc 22 of the vane assembly 23 is provided with a pair of apertures for each vane, each pair straddling its respective vane. In Figure 6, these apertures or ports are designated by the numerals 46 and 52. Similar ports are provided in the disc 33 of the vane assembly 23 and the ports in this assembly are designated by the numerals 53 and 47. The ports referred to sometimes act as intake ports and sometimes as exhaust ports depending upon their position in the operating cycle. There are also provided through the water jackets 40 and 41 intake leads 48 and 49, respectively, and exhaust leads 50 and 51, respectively. These intake and exhaust leads, as well as the spark plug housings, are at the same radial distance as the ports in the respective adjacent discs so that they register with said ports in rotating. The intake leads are disposed 90° from the spark plug housings while the exhaust leads are between 60° and 70° from the spark plug housings, the exact location of which would depend upon the operating characteristics of the engine for optimum efficiency. The water jackets 39, 40, and 41 are connected to a suitable circulating system (not shown). All of the ports in discs 28 and 33 act as exhaust ports when they register with exhaust leads 50 or 51 because at the moment of such registration, the explosion has taken place and the exhaust stroke in the cycle is ready to begin. Similarly, all ports in discs 28 and 33 may act as intake ports at the moment of registration with intake leads 48 and 49 as at the moment of such registration, the intake stroke in the operation cycle is beginning. In other words, whenever a port in the discs 28 and 33 registers with an intake lead, it acts as an intake port and when it registers with the exhaust leads, it acts as an exhaust port. Also, whenever a port registers with a spark plug housing, it is utilized as a combustion or firing port. Consequently, the ports serve three functions, namely, they act as firing ports, intake ports and exhaust ports, depending upon whether they register with the housing of the spark plug, the intake leads or exhaust leads.

In order to provide for a continuous positive application of power, it is necessary to establish a rule of action between the two vane assemblies 22 and 23 that will cause them to rotate alternately from a maximum to a minimum velocity, the minimum velocity being nearly but not quite zero. The theory of operation is as follows: Considering any two consecutive vanes which would consist of one blade from the vane assembly 22 and one blade from the vane assembly 23, the explosion of the fuel is so timed that for every revolution of each blade it goes through four cyclic changes, each cycle consisting of an acceleration and a deceleration so controlled that the blades on one assembly are decelerating while the blades on the other assembly are accelerating so that the blades of one assembly reach a maximum velocity at the time the other assembly reaches a minimum velocity. At definite intervals the two blades will be moving at the same velocity. At such intervals any two consecutive blades will be either a maximum distance apart or a minimum distance apart. Just before any two blades are at their minimum distance apart, either ignition takes place or the exhaust valve is closed with a corresponding opening of the intake valve, depending again upon the position of the steps in question in the operation cycle of the engine. It will be understood that when the blade assemblies are moving at the same velocity they are in extreme positions in relation to each other. When the blades of the vane assemblies are equally spaced they are at their maximum differential velocity. As the two vane assemblies continue to go through their relative movements, the spaces between their respective vanes become larger and smaller. Fuel is drawn in, compressed, exploded, and exhausted. This cycle of operation occurs twice during each revolution of the engine for each of the spaces between the vane assemblies when operating on a four-stroke cycle principle, such as the Otto. It will be understood that while explosion of the fuel or the power stroke takes place at a point where one of the blades is decelerating with respect to the casing of the engine, it is actually accelerating with respect to its immediately trailing blade.

To constantly maintain these relative movements of the vanes, the converter unit is employed. This unit also changes the vane movement into a uniform rotary motion. This unit receives an extension of the shaft 34, which shaft is rotatably mounted in a bearing 55 in the flywheel 56. This flywheel is flanged at both ends like a spool. Between these flanges, designated by the numerals 57 and 58, four pinions or planet gears 59, 60, 61, and 62 are fixedly mounted on shafts 63, 64, 65, and 66, respectively, in 90° circumferentially spaced relation. Said pinions are held in constant mesh with an internal ring gear 67 secured to the inner wall of housing 21 of the converter. The drive shaft or take-off shaft of the motor is designated by the numeral 68 and it is keyed or otherwise fixed to the flywheel 56. The shafts 63, 64, 65, and 66 extend a short distance in the direction of the power unit through the flange 58 to each of which is secured a short crank arm 69, 70, 71 and 72, respectively.

The sleeve 36 extends a short distance into the converter unit and it is fixed to the center of an arm 73, which arm is forked at both ends rotatably carrying shafts 74 and 75, respectively, in suitable bearings. To each of these shafts 74 and 75, pinion or planet gears 76 and 77, respectively, are fixedly mounted, said gears meshing with another internal ring gear 78 adjustably disposed around the inner wall of the converter casing 21. The adjustable feature may be taken care of by any suitable means, such as a set screw 79 mounted through the slot 80 in the casing of the converter. The purpose of this adjustable feature is to change the compression ratio and length of effective stroke which change may be accomplished while the motor is in operation. Another arm 81, similar to the arm 73, is fixed to the shaft 34, the hub of which provides a bearing for the extended hub of the arm 73. The ends of the arm 81 are provided with gears or planets 82 and 83 on shafts 84 and 85, respectively, substantially the same as those provided on the arm 73 meshing also with the ring gear 78. The gear ratio between each of the gears 76, 77, 82, 83 to the ring gear 78, and each of the gears 63, 64, 65, and 66 to the ring gear 67, is 1 to 4 in the embodiment illustrated. Generally speaking, the ratio is one to the number of vanes used in each vane assembly.

The ends of the shafts 74, 75, 84 and 85 are secured to arms 86, 87, 88 and 89 having eccentric stub shafts 90, 91, 92 and 93 to which are pivotally attached one end of connecting rods 94, 95, 96 and 97, respectively. The other ends of the said connecting rods are pivotally connected to the crank on arms 69, 71, 72 and 70, respectively, substantially as shown.

Figure 3:
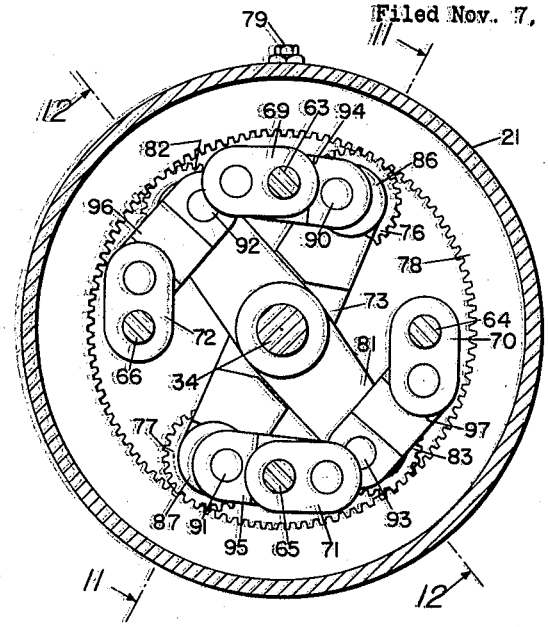
Figure 3 is a section along the line 3—3 of Figure 1.
Figure 2:
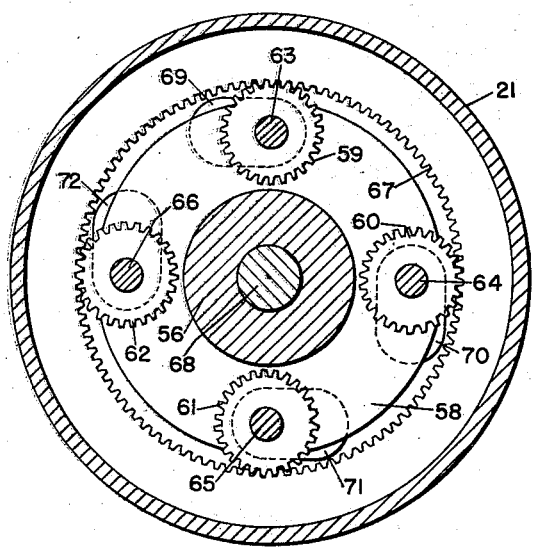
Figure 2 is a section along the line 2—2 of Figure 1.
Figure 11:
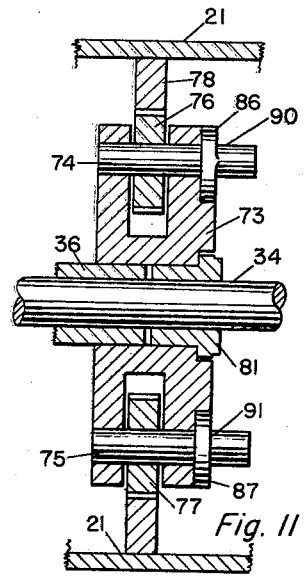
Figure 11 is a section along the line 11—11 of Figure 3.
Figure 12:
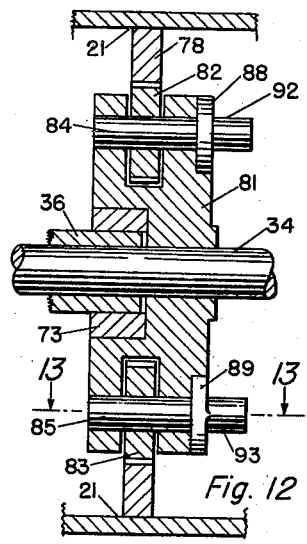
Figure 12 is a section along the line 12—12 of Figure 3.
Figure 13:
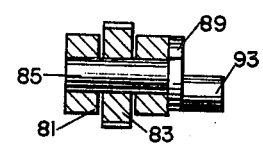
Figure 13 is a section along the line 13—13 of Figure 12.
Figure 5:
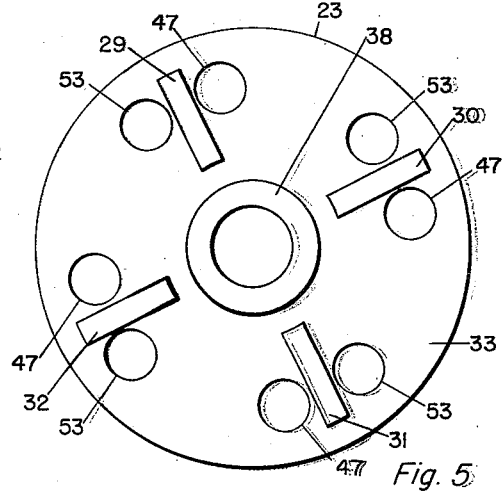
Figure 5 is an end view of the vane assembly 23.

The operation of the converter unit is as follows: The forces set up between the vane assemblies tend to rotate the arms 73 and 81 in opposite directions. (In this part of the description reference is made to the upper part of Figures 2 and 3.) When the blades of the vane assemblies are in their extreme positions with respect to each other the relative position of the arms 73 and 81 will be as shown in Figure 3. At that point there will be a force tending to rotate the arm 81 counter-clockwise, and the arm 73 clockwise. The force acting on the arm 73 is exerted through the eccentric stub shaft 90 to the connecting rod 94 setting up a tension in this member which acts on the crank arm 69. This force has the effect of rotating the shaft 63 to which the pinion gear 59 is attached in a counter-clockwise direction, which in turn has the effect of rotating the entire flywheel assembly 56 in a clockwise direction. Although the force acting on the arm 81 is equal and opposite at all times to the force acting on the arm 73, still the leverage or moment arm is consistently smaller when the force acting through the connecting link 96 is in alignment with the intersection of the gear 62 and the ring gear 67 which continues until the center of the connection between the connecting link 96 and the crank arm 72 is past the line drawn from the center of the shaft 34 to the center of the gear 62. The moment arm being zero, the force acting produces zero moment. Consequently, the force exerted through the arm 73 accomplishes useful work in the form of rotating the flywheel 56 to which the drive shaft 70 is fixed in addition to changing the relation between the vanes of the vane assembly. This action takes place during a complete cycle and it is performed simultaneously with the linkage at the opposite ends of the arms 73 and 81. This cycle is repeated for each eighth of a revolution with the arms 73 and 81 alternating in relative positions with corresponding reversals of forces acting thereon.

The converter unit is timed with the power unit in such a way that the power strokes take place while the force acting through link 96 is in alignment with the point of contact of the gear 62 with the ring gear 67.

The eccentric stub shafts 90, 91, 92 and 93 are employed for the purpose of timing the vane assemblies. If, for example, the link or connecting rod 94 were secured concentrically with the pinion 76, the trailing vanes would run into the vanes immediately ahead instead of slowing down as they approach, because the displacement of each vane would be exactly 90° before the forward vane would begin its movement. The eccentric feature provides a less than 90° displacement. This timing, however, is not fixed but may be adjusted for optimum performance of the engine by rotatably adjusting ring gear 78 within the converter casing 21 which changes the position of the gears 59, 60, 61 and 62 relative to the arms 73 and 81.

Having thus described my invention, I claim:

1. In a rotary internal combustion engine having two co-acting vane assemblies and a stator housing therefor forming sealed volumetrically variable chambers within which the power of the engine is developed, a mechanism for controlling the relative movements of said vane assemblies and transforming the power developed in said chambers to uniform rotary motion, said mechanism comprising an arm secured to an extended shaft of each of said vane assemblies, pinions secured to shafts rotatably mounted at the end of each of said arms, a ring gear meshing with said pinions, crank arms secured to said shafts, a flywheel rotatably mounted on the end of one of said extended shafts, pinions secured to stub shafts rotatably mounted on said flywheel, a ring gear meshing with said last-mentioned pinions, connecting rods each having one end secured to said stub shafts and the other end pivoted to one of said crank arms.

2. The mechanism as defined by claim 1 in which the first mentioned ring gear is rotatably adjustable.

3. The mechanism as defined by claim 1 in which the flywheel is flanged in a spool-like manner and pinions secured to stub shafts are disposed between said flanges, said stub shafts having bearings in said flanges.

4. In a rotary internal-combustion engine having two co-acting vane assemblies and a stator housing therefor, forming sealed volumetrically variable chambers within which the power of the engine is developed, a mechanism for controlling the relative movements of said vane assemblies and for transforming the power developed in said chamber to uniform rotary motion, said mechanism comprising an arm secured to an extended shaft of each of said vane assemblies, pinions secured to said shafts rotatably mounted at the end of each of said arms, a ring gear meshing with said pinions, said ring gear being rotatably adjustable, crank arms secured to said shaft, a flywheel rotatably mounted on the end of one of said extended shafts, pinions secured to stub shafts rotatably mounted on said flywheel, a ring gear meshing with said last-mentioned pinions, connecting rods each having one end secured to said stub shafts and the other end pivoted to one of said crank arms, means for adjusting the said first-mentioned ring gear while the engine is in operation, whereby the length of operating stroke, compression ratio, and rate of displacement can be changed to vary the operating characteristics of the engine.

GERALD E. RYERSON.